US010827040B2

(12) United States Patent
Caldwell (10) Patent No.: US 10,827,040 B2
(45) Date of Patent: Nov. 3, 2020

(54) SYSTEM AND METHOD FOR ENABLING LOSSLESS INTERPACKET GAPS FOR LOSSY PROTOCOLS

(71) Applicant: Avago Technologies International Sales Pte. Limited, Singapore (SG)

(72) Inventor: Maurice D. Caldwell, Lakeway, TX (US)

(73) Assignee: AVAGO TECHNOLOGIES INTERNATIONAL SALES PTE. LIMITED, Singapore (SG)

(*) Notice: Subject to any disclaimer, the term of this patent is extended or adjusted under 35 U.S.C. 154(b) by 199 days.

(21) Appl. No.: 16/013,007

(22) Filed: Jun. 20, 2018

(65) Prior Publication Data

US 2019/0394304 A1    Dec. 26, 2019

(51) Int. Cl.
*H04L 29/06*    (2006.01)
*H04L 1/00*    (2006.01)
*H04L 25/49*    (2006.01)

(52) U.S. Cl.
CPC ............ *H04L 69/08* (2013.01); *H04L 1/0078* (2013.01); *H04L 25/49* (2013.01); *H04L 69/18* (2013.01)

(58) Field of Classification Search
CPC ......... H04L 69/04; H04L 69/08; H04L 47/38; H04L 25/49
See application file for complete search history.

(56) References Cited

U.S. PATENT DOCUMENTS

| 2004/0156390 A1* | 8/2004 | Prasad | H04J 3/1617 370/466 |
| 2005/0102419 A1* | 5/2005 | Popescu | H04L 43/00 709/238 |
| 2015/0271074 A1* | 9/2015 | Hirth | H04L 47/12 398/68 |
| 2015/0326504 A1* | 11/2015 | Yu | H04L 12/413 370/392 |
| 2015/0381312 A1* | 12/2015 | Basso | H03M 13/15 714/776 |
| 2016/0380647 A1* | 12/2016 | Bansal | H03M 7/30 370/389 |
| 2017/0026128 A1* | 1/2017 | Remein | H04L 69/08 |

* cited by examiner

*Primary Examiner* — Marcus Smith
(74) *Attorney, Agent, or Firm* — Morgan, Lewis & Bockius LLP (57) ABSTRACT

A communication device, method, and data transmission system are provided. An illustrative method is disclosed to include at least one data port and lossless IPG circuitry that operates on the transmit-side and/or receive-side of the data transmission system. The lossless IPG circuitry may include a lossless IPG insertion circuit and/or a lossless IPG removal circuit that work in cooperation with each other to ensure that data streams do not violate any predefined communication protocols or requirements thereof.

17 Claims, 10 Drawing Sheets

SYSTEM AND METHOD FOR ENABLING LOSSLESS INTERPACKET GAPS FOR LOSSY PROTOCOLS

FIELD OF THE DISCLOSURE

The present disclosure is generally directed toward communication systems and methods and, more specifically, toward Physical Coding Sub-Layer (PCS) protocols.

BACKGROUND

Certain communication protocols require or define a minimum number of Interpacket Gaps (IPGs) to be sent by a transmit-side Media Access Control (MAC). As an example, the IEEE Ethernet requires a minimum IPG of 12 bytes to be sent by the transmit MAC. As the traffic traverses the Reconciliation Sub-Layer (RS layer) and the Physical Coding Sub-Layer (PCS layer), the 12 bytes of IPG may be reduced down to a minimum, at the point where the traffic is sent along to the Media Dependent Interface (MDI). This minimum degradation threshold of IPG loss is required to facilitate end-to-end interoperability as the traffic traverses to the far end network remote device. As a more specific example, for MII (10M/100M) and GMII (1G) Ethernet, the minimum IPG at the transmit MDI should be approximately 11 bytes. As another example, the XGMII, the minimum IPG at the transmit MDI should be approximately 9 bytes.

BRIEF DESCRIPTION OF THE DRAWINGS

The present disclosure is described in conjunction with the appended figures, which are not necessarily drawn to scale.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any location within a distributed network of components without impacting the operation of the system.

Furthermore, it should be appreciated that the various links connecting the elements can be wired, traces, or wireless links, or any combination thereof, or any other known or later developed element(s) that is capable of supplying and/or communicating data to and from the connected elements. Transmission media used as links, for example, can be any suitable carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably and include any type of methodology, process, mathematical operation or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-10, various systems and methods for enabling data transmission and protocol compliance will be described. While particular embodiments will be described in connection with facilitating communications using a particular communication protocol (e.g., Ethernet), it should be appreciated that embodiments of the present disclosure are not so limited. For example, the methods and systems described herein may be utilized in connection with any type of communication protocol that defines a minimum IPG size (e.g., in bytes, columns, etc.) or similar packet type.

The problem of IPG reduction is often introduced because certain protocols require that Alignment Markers (AMs) are to be periodically inserted into the traffic at fixed spaces or intervals. The AMs help to facilitate port delineation between the transmit-side and receive-side of the system. To maintain a constant traffic flow rate, the PCS sometimes requires that an IPG be removed/deleted in proportion to the amount of AMs that are inserted. This IPG removal/deletion can cause a catastrophic event if care is not taken to repair the IPG back to the minimum threshold amount.

One aspect of the present disclosure is to provide a lossless IPG function/circuitry that operates, in tandem, on traffic (e.g., a data stream) in both the transmit and receive PCS data paths. In some embodiments, on the transmit-side, as XGMII IDLE columns are deleted/removed to make room for the AM insertions, the XGMII IDLE column that precedes the start of the IDLE deletion is tagged with the total count of the number of XGMII IDLE columns that were deleted within the current IPG interval. The tagged XGMII IDLE column is replaced with, for instance, a proprietary IEEE Sequence Ordered Set (i.e. a current, reserved IEEE 802.3 Sequence Ordered Set) in which XGMII octets {3, 2, 1, 0}=‖QN‖={{1'b0, <delete count>}, {1'b0, <delete count>}, {1'b0, <delete count>}, 0x19C}. In some embodiments, the Sequence Ordered Set column ‖QN‖ may correspond to a filler column containing information that describes manipulations made to the IPG interval (e.g., by describing a number of IDLE columns <N> that have been deleted from the IPG interval).

Continuing the above non-limiting example, on the receive-side, following the detection of the XGMII ‖T‖ (terminate) column, all subsequent XGMII IPG columns (e.g., the IDLE column and the Sequence Ordered Set) are searched for detection of the Sequence Ordered Set ‖QN‖={{1'b0, <delete count>}, {1'b0, <delete count>}, {1'b0, <delete count>}, 0x19C}. Upon detection of the ‖QN‖, the "delete count" is extracted, and the Sequence Ordered Set is replaced with an XGMII IDLE column. The "delete count" is then used by the XGMII IDLE column insertion function to insert N (<delete count>) XGMII IDLE columns during the current IPG interval.

Said another way, embodiments of the present disclosure provide a lossless IPG function or circuitry that operates, in tandem, on XGMII traffic in both the transmit and receive PCS data paths, by tagging the transmit IPG and using the tags to perform the inverse on the receive traffic, in order to completely recover the original TX MAC/RS IPG intervals.

Figure 1:
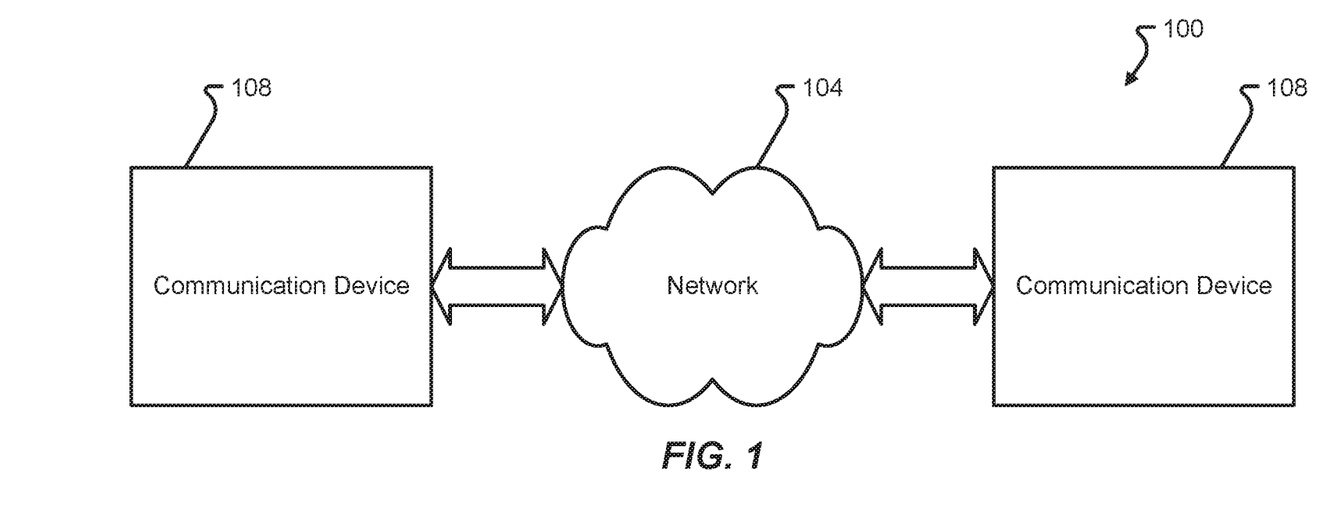
FIG. 1 is a block diagram depicting a data transmission system in accordance with at least some embodiments of the present disclosure.

With reference now to FIG. 1, additional details of a first data transmission system 100 will be described in accordance with at least some embodiments of the present disclosure. The data transmission system 100 is shown to include two communication devices 108, each of which are connected with a communication network 104. The communication devices 108 may be considered to be communicatively coupled with one another via the communication network 104. Although the communication devices 108 may be provided as any type of machine or collection of components, some non-limiting examples of a communication device 108 include a mobile phone, a smart phone, a Personal Computer (PC), a laptop, a telephone, a tablet, a server, a switch, or data storage device, etc. It should be appreciated that one or both communication devices 108 may be user devices (e.g., devices that are carried and utilized by a user) having a user interface. Alternatively, one or both communication devices 108 may be servers, switches, or other types of machines that are devoid of a robust user interface. Said another way, the communication devices 108 may correspond to any type of machine capable of communicating with another machine via the communication network 104.

The communication network 104 may correspond to any type of communication bus, collection of communication devices, combinations thereof, or the like. As an example, the communication network 104 may correspond to a packet-based communication network. Even more specifically, the communication network 104 may correspond to an IP-based communication network and may use communication protocols such as the Ethernet protocol. It should be appreciated that the communication network 104 does not necessarily need to be limited to an Ethernet-based communication network, but rather any interconnected collection of computing devices using any type of communication protocol or combination of communication protocols may qualify as the communication network 104. The communication network 104 may utilize wired and/or wireless communication protocols.

Figure 2:
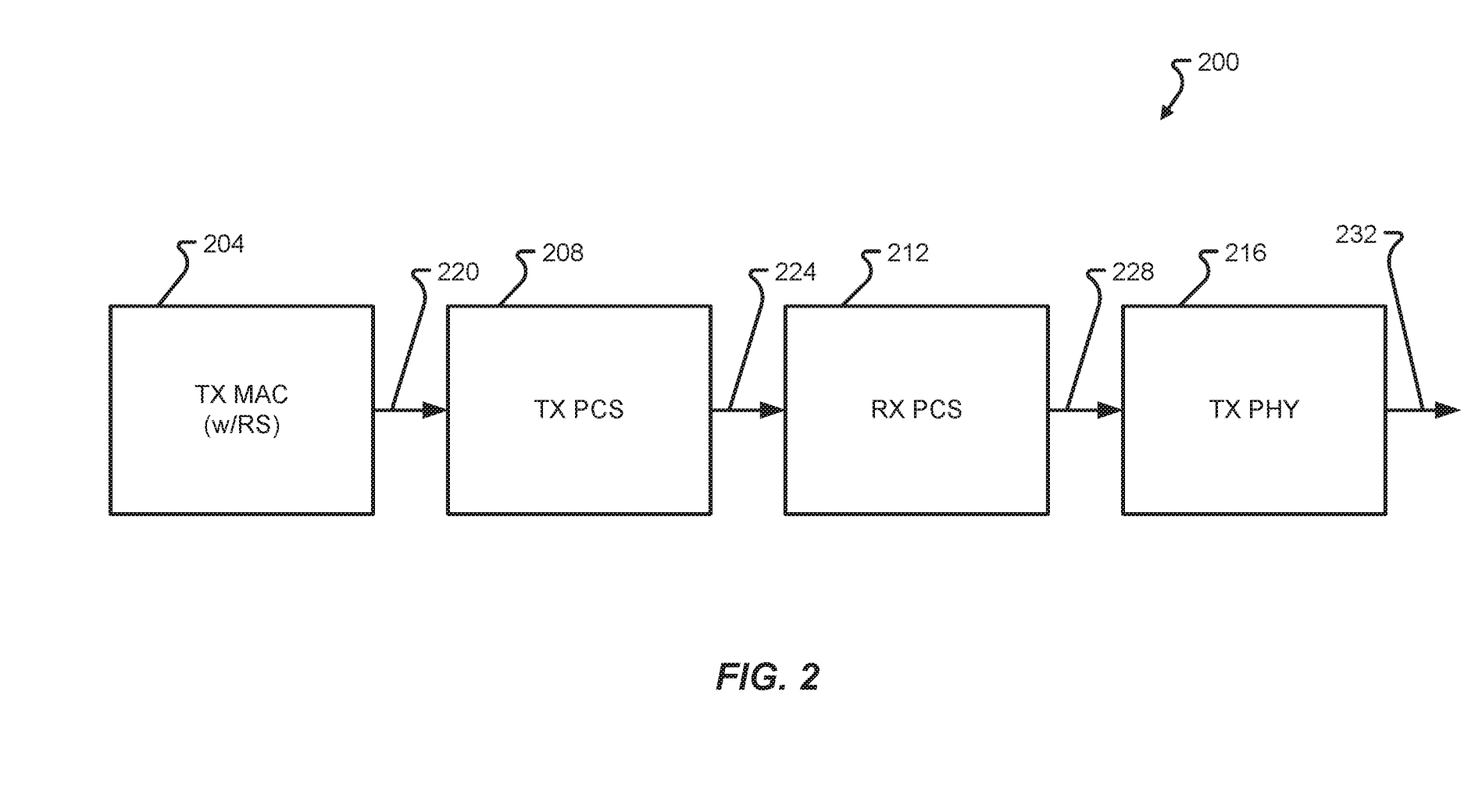
FIG. 2 is a block diagram depicting additional details of a data transmission system in accordance with at least some embodiments of the present disclosure.

With reference now to FIG. 2, additional details of a data transmission system 200 will be described in accordance with at least some embodiments of the present disclosure. The data transmission system 200 may be provided as part of a communication device 108, as part of a component of a communication device 108, or as part of a component within the communication network 104. As a non-limiting example, the system 200 may be provided as part of a networking adaptor within a communication device 108 (e.g., a component of the communication device 108 that enables communications via the network 104). As such, the system 200 may be provided on a network card or board within a host device. In some embodiments, the system 200 is configured to facilitate the transfer of data from one communication device 108 to another communication device 108.

The system 200 is shown to include a transmitter MAC (TX MAC) 204, a transmitter PCS (TX PCS) 208, a receiver PCS (RX PCS) 212, and a transmitter PHY (TX PHY) 216. The TX MAC 204 is shown to include an RS layer. A first data path 220 is shown to connect the TX MAC 204 with the TX PCS 208. The first data path 220 may carry data traffic of a first type. As a non-limiting example, the first data path 220 may carry XGMII traffic from the TX MAC 204 to the TX PCS 208. The XGMII traffic flowing on the first data path 220 may have any number of IPG intervals of various sizes ranging from a first threshold value to a second threshold value. As a non-limiting example, the XGMII traffic, if compliant with IEEE 802.3 standards (e.g., transmit MAC provides a minimum of 12 bytes of IPG) may carry anywhere between 9 bytes and 15 bytes of IPG per IPG interval, as a result of the Deficit Idle Counter (DIC).

The TX PCS 208 may process the data traffic received from the TX MAC 204 and perform an AM insertion process on the received data traffic. As part of performing this AM insertion process, the TX PCS 208 may remove one or more IPG columns from an IPG interval. The TX PCS 208 may be required to insert the AM intervals to facilitate port delineation at the receive-side of the communication network 104. As will be discussed in further detail herein, a lossless IPG function/circuitry may operate on data flowing through the first data path 220 by tagging transmitted IPG intervals with appropriate information that will allow a counterpart lossless IPG function/circuitry on the receive-side (e.g., processing data on the data path 228) to identify the tag(s) and completely recover the IPG columns that were removed to accommodate AM insertion. The lossless IPG function/circuitry operating on both sides of the communication network 104 helps to guarantee that the XGMII traffic at both paths 220, 228 are identical. As will be discussed in further detail herein, a lossless IPG function/circuitry may include a combination of a lossless IPG insertion circuit (on the transmit-side) and a counterpart lossless IPG removal circuit (on the receive-side). These counterpart components may collectively be referred to as a lossless IPG function or lossless IPG circuitry (generally referred to hereinafter as lossless IPG function for ease of reference), but each individual component on the transmit or receive-side may also be referred to as lossless IPG circuitry or a part of a lossless IPG function without departing from the scope of the present disclosure.

In some embodiments, the system interface 224 between the TX PCS 208 and RX PCS 212 may carry data traffic in violation of a minimum threshold amount of IPG per IPG interval. This is acceptable because the lossless IPG function at the receive-side of the system will be able to recover the IPG columns previously removed at the transmit-side of the system. The lossless IPG function at the receive-side of the system may be positioned within the RX PCS 212 or just behind the RX PCS 212 to ensure that data traffic placed onto the MDI 232 is compliant with the communication protocols being employed (e.g., an appropriate IPG interval side is maintained).

Figure 3:
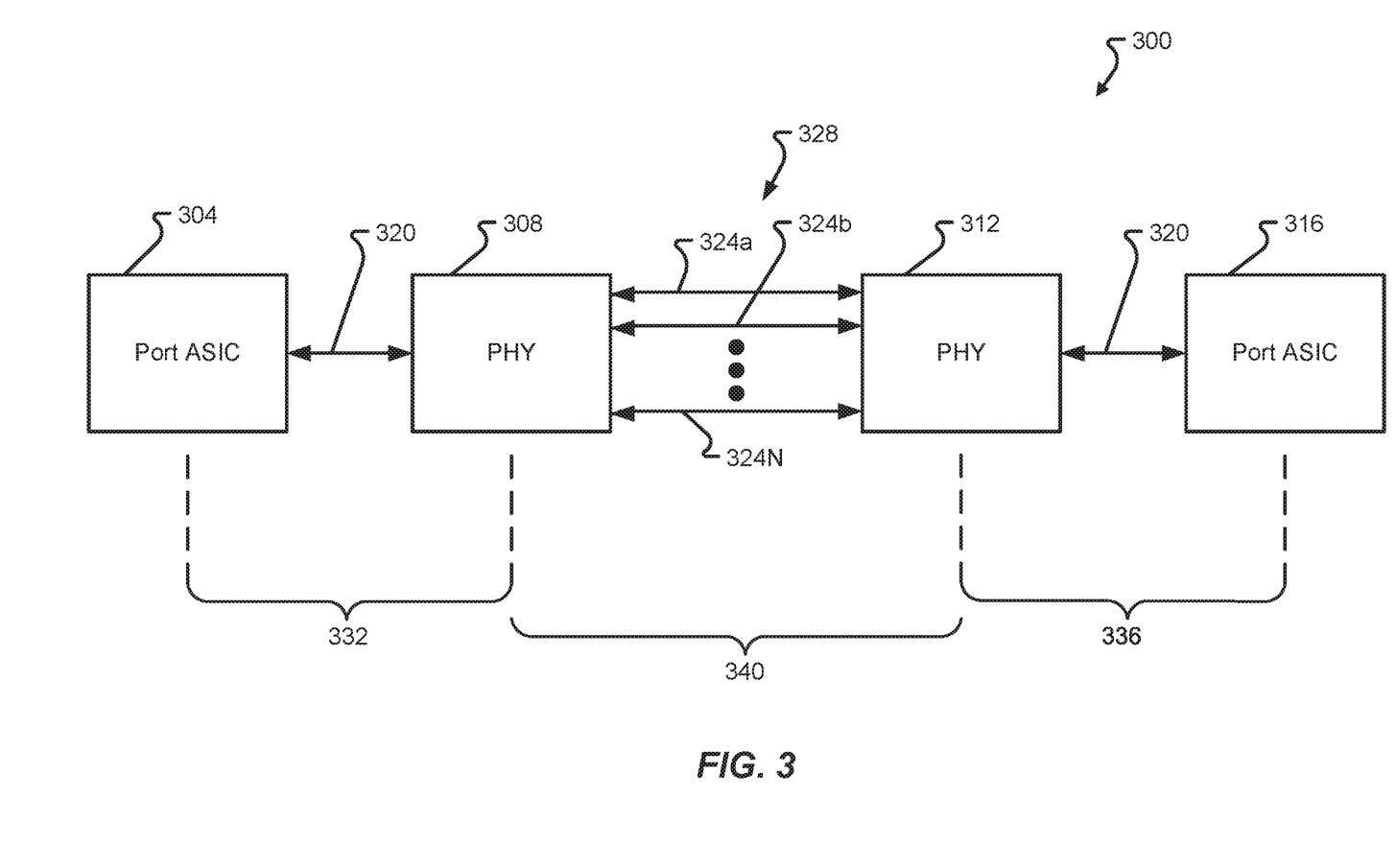
FIG. 3 is a block diagram depicting additional details of a data transmission system in accordance with at least some embodiments of the present disclosure.

With reference now to FIG. 3, additional details of a data transmission system 300 will be described in accordance with at least some embodiments of the present disclosure. The system 300 may be similar to system 100 and/or 200. The view of system 300 specifically shows a first port ASIC 304 and second port ASIC 316 in communication with one another via their respective PHYs 308, 312 and a network interface 328. The network interface 328 may be similar or identical to the MDI 232 shown in FIG. 2. Likewise, the PHYs 308, 312 may be similar or identical to the TX PHY 216 shown in FIG. 2. Further still, the ASICs 304, 316 may correspond to MACs, such as MAC 204, without departing from the scope of the present disclosure.

FIG. 3 helps to illustrate the various clock domains of a data transmission system 300 and depict further details of the network interface 328. In particular, a first system interface 320 is shown between the port ASIC 304 and TX PHY 308. The first system interface 320 may correspond to a USXGMII-M system interface. The network interface 328, as mentioned above, may correspond to an example of an MDI. In some embodiments, the network interface 328 may correspond to a copper MDI, although any type of MDI or media interface can be used without departing from the scope of the present disclosure.

The network interface 328 is shown to include a plurality of signal lines 324*a*-N. The number N of lines 324 may vary depending upon the communication protocol used within the system 300. Each line 324 may be configured to carry a different signal from a transmission side of the system 300 (e.g., the PHY 308) to the receiving side of the system 300 (e.g., the PHY 312).

The PHY 312 is shown to be connected to the port ASIC 316 by another system interface 320. The system interface 320 on the receive-side of the system 300 may be similar or identical to the system interface 320 on the transmit-side of the system 300, although such a configuration is not required.

The transmit-side is shown to operate using a first clock domain 332, which is separate from the second clock domain 336 in which the receive-side operates. The clock domains 332, 336 are separated by the network interface clock domain 340. In some embodiments, each clock domain may be nearly synchronized with one another, but may be driven by different processors or timing crystals, which may have slightly different timing characteristics from processors or timing crystals in the other clock domains. Because of the differences in clock domains 332, 336, a clod-data recovery (CDR) circuit may be provided on the receiver side of the transmission system. In systems which place data from multiple ports onto a single wire, AMs may be used to facilitate port delineation for the receiver. As a non-limiting example, four AMs (e.g., AM0, AM1, AM2, AM3) may be inserted contiguously as a group at a fixed spacing interval. In a simple case, the very first 66-bit encoded/scrambled block following AM3 is assigned to Port0 followed sequentially in ascending order with the remaining blocks of the other ports; then the order is repeated.

Figure 4:
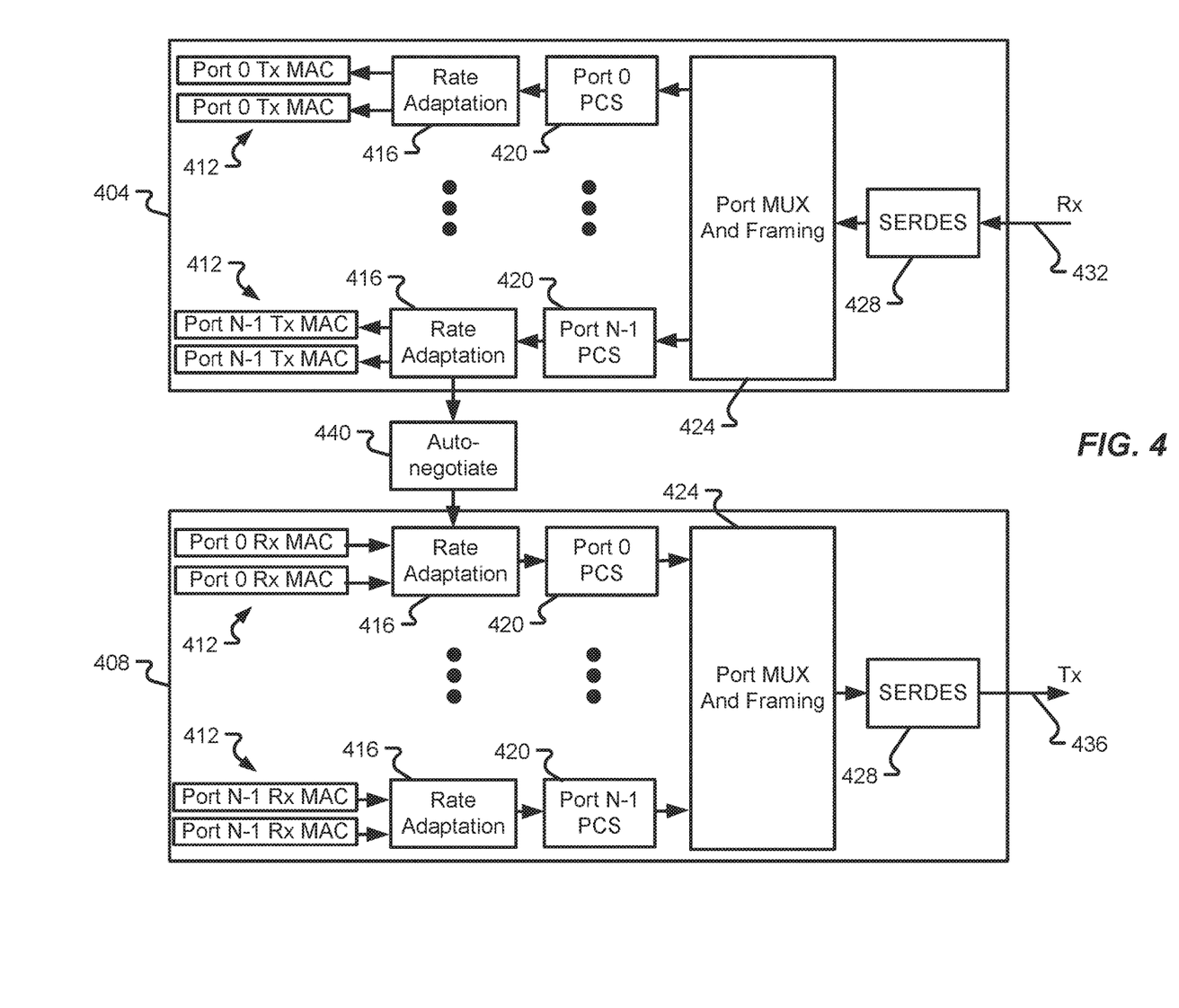
FIG. 4 is a block diagram depicting additional details of a data transmission system in accordance with at least some embodiments of the present disclosure.

With reference now to FIG. 4, additional details of a data transmission system will be described in accordance with at least some embodiments of the present disclosure. The components depicted in the system may correspond to specific components included in a PHY. For instance, a transmit-side set of components 404 and a receive-side set of components 408 may each comprise a number of components that facilitate the transmit-processing and receive-processing of data streams in accordance with at least some embodiments of the present disclosure. The sets of components 404, 408 may be provided as part of a PHY 216, 308, 312, as part of an ASIC 304, 316, and/or as part of a MAC 204 without departing from the scope of the present disclosure.

The transmit-side set of components 404 is shown to include a number of transmit port MACs 412. Pairs of transmit port MACs 412 may be connected with a rate adaption circuit 416, which is configured to remove replication of data packets and perform other known rate-adaptation processes. For instance, data may be replicated to put one port to a slower rate (so that all rates of all ports match for the port MUX and framing circuit 424). In some embodiments, a first of the transmit port MACs 412 may communicate with the rate adaptation circuit 416 using a first protocol (e.g., XGMII) whereas the second of the transmit port MACs 412 may communicate with the rate adaptation circuit 416 using a second protocol (e.g., GMII (10M/100M/1G)). The rate adaptation circuit 416 enables a single port 420 to share information with a transmit port MAC 412 using one of several different types of protocols and helps to match the transmit rates of the various ports. The transmit-side set of components 404 is also shown to include a plurality of port PCSs 420 (e.g., one port PCS for each of the ports 0 thru N−1). The plurality of port PCSs 420 are connected to a common port multiplexer (MUX) and framing circuit 424. The port MUX and framing circuit 424 may be configured to distribute different data packets among the different transmit port PCSs 420.

The port MUX and framing circuit 424 may be configured to receive a data stream from a Serializer/Deserializer (SERDES) circuit 428, which is connected to a receive input 432. Thus, any data stream received at the input 432 may first be processed by the SERDES 428, then provided to the port MUX and framing circuit 424. Thereafter, the port MUX and framing circuit 424 distributes the data traffic among the various port PCSs 420.

The receive-side set of components 408 may be configured to communicate with the transmit-side set of components 404 via an auto-negotiate circuit or set of circuits 440. The auto-negotiate circuit or set of circuits 440 may be configured to facilitate synchronization between the rate adaption circuits 416 on the transmit-side 404 and rate adaptation circuits 416 on the receive-side 408. The various components on the receive-side 408 may be similar to those on the transmit-side 404; however, the connection of components may be reversed with respect to the transmit-side 404. In particular, the receive port MACs 412 may be provide a data stream to the ports PCSs 420 via the rate adaptation circuits 416. Again, each rate adaptation circuit 416 may have a pair of receive port MACs 412 connected thereto. A first receive port MAC 412 may communicate with the rate adaptation circuit 416 using XGMII whereas the second receive port MAC 412 may communicate with the rate adaptation circuit 416 using GMII (e.g., 10M/100M/1G). In other words, the port MACs 412 connected to a particular rate adaptation circuit 416 may utilize different protocols for communicating with the rate adaptation circuit 416 without departing from the scope of the present disclosure. The various port PCSs 420 may be connected to a common port MUX and framing circuit 424 that combines the various inputs onto the SERDES 428 for the output line 436.

Figure 5:
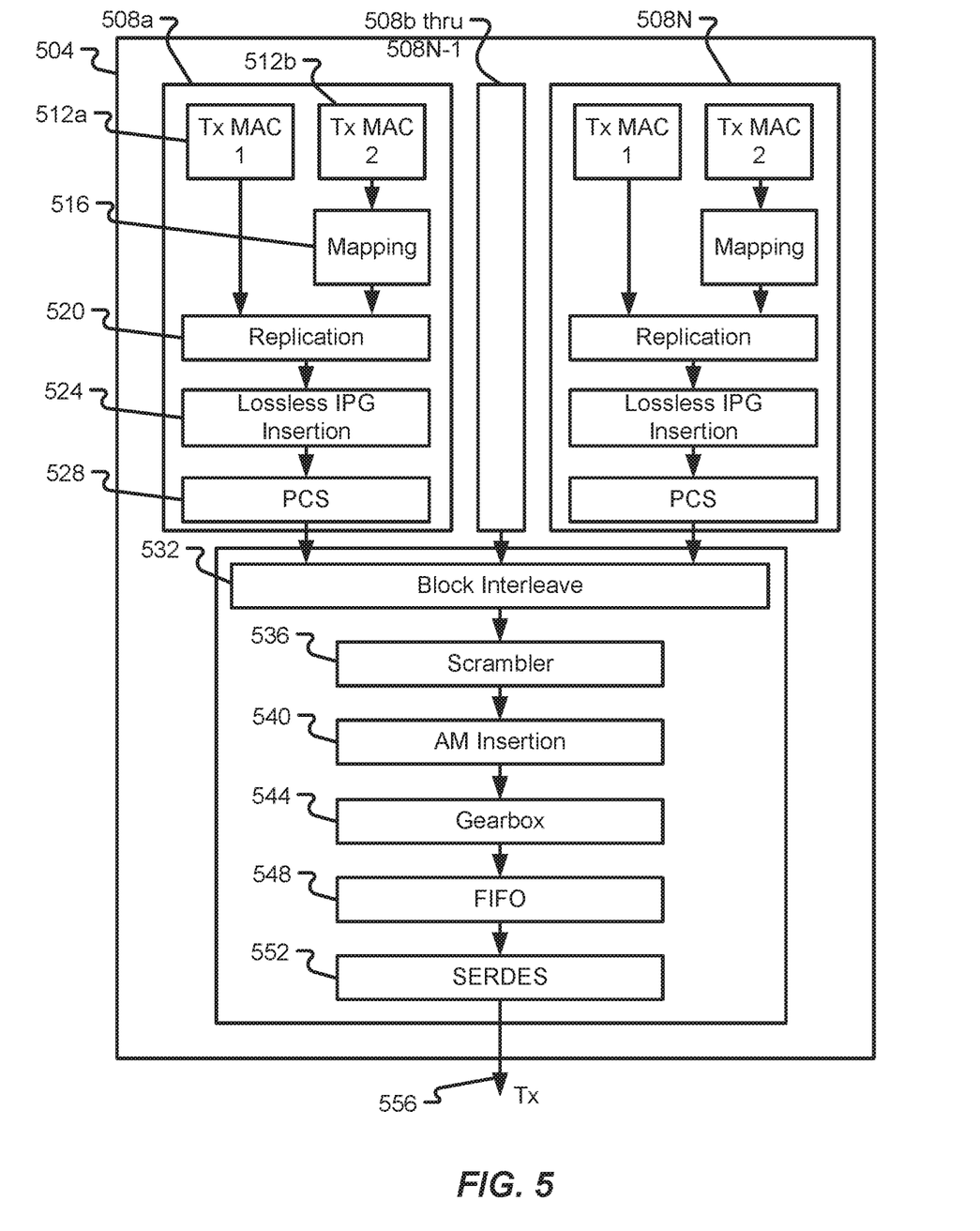
FIG. 5 is a block diagram depicting a transmit-side of a data transmission system in accordance with at least some embodiments of the present disclosure.

With reference now to FIG. 5, additional details of a port ASIC 504 will be described in accordance with at least some embodiments of the present disclosure. The port ASIC 504 may correspond to a transmission port ASIC 504 and may be similar or identical to a port ASIC 304, 316 and/or a TX MAC 204 without departing from the scope of the present disclosure.

The transmission port ASIC 504 may include a number of components that facilitate the transmission of data streams in accordance with at least some embodiments of the present disclosure. In particular, the transmission port ASIC 504 may include a plurality of ports 508a-N along with a plurality of additional circuits configured to process information from the various ports 508a-N. Each of the ports 508a-N may be provided with a first transmission (Tx) MAC 512a and a second Tx MAC 512b. The first Tx MAC 512a may be directly connected with a replication circuit 520 whereas the second Tx MAC 512b may be connected with the replication circuit 520 via a mapping circuit 516. The mapping circuit 516 may be configured to map inputs from the second Tx MAC 512b into a format consistent with the first Tx MAC 512a. As a more specific but non-limiting example, the first Tx MAC 512a may utilize XGMII protocols to communicate with the replication circuit 520 whereas the second Tx MAC 512b may utilize 10M/100M/1G communication protocols or some other communication protocol different from the first Tx MAC 512a.

The mapping circuit 516 enables the mapping of the second protocol to the first protocol. More specifically, the mapping circuit 516 may be configured to perform a protocol mapping that enables the replication circuit 520 to receive data streams from both Tx MACs 512a, 512b in a common format (e.g., either the first protocol format or the second protocol format). As a more specific example, the mapping circuit 516 may be configured to perform reference clock conversions, frequency conversions, packet insertion, packet removal, or combinations thereof to map the first protocol to the second protocol within each port 508a-N.

The replication circuit 520 may be configured to perform data replication on the data streams received from one or both Tx MACs 512a, 512b to ensure that data rates of any particular port match the data rates of other ports 508. In particular, the replication circuit 520 may reproduce data packets, blocks, bits, or other representations of data from the Tx MACs 512a, 512b a predetermined number of times to slow down the data transmission rate as appropriate. The replication circuit 520 may reproduce the data anywhere from 10 to 1000 times, depending upon the communication protocol(s) employed.

The replication circuit 520 provides its output to a component of the lossless IPG function. Specifically, the output of the replication circuit 520 may be provided to a lossless IPG insertion circuit 524. According to some embodiments, the lossless IPG insertion circuit 524 may be configured to operate on the transmit MAC/RS XGMII traffic. More specifically, the lossless IPG insertion circuit 524 may be configured to detect and delete one or more ||I|| columns from a particular IPG interval. More specifically, the lossless IPG insertion circuit 524 may be provided with a mechanism (e.g., a clock-compensation FIFO buffer) that deletes <N> contiguous XGMII ||I|| columns, in a given IPG interval, in order to satisfy the rate at which AMs are periodically inserted at the very end of the transmit PCS data path. At the end of the XGMII ||I|| column deletion event, the XGMII ||I|| column preceding the start of the deletion events may be replaced with the XGMII ||QN|| (e.g., a Sequence Ordered Set) column that contains the delete count. As a non-limiting example, ||QN||={{1' b0, <delete count>}, {1' b0, <delete count>}, {1'b0, <delete count>}, 0x19C}. The insertion of the ||QN|| column is used to convey to the receive circuit the total number of XGMII ||I|| columns that must be inserted in the IPG for which the ||QN|| column is detected, thereby, completing the lossless IPG function.

In some embodiments, the output of the lossless IPG insertion circuit 524 shows the reduced IPG interval with the ||QN|| column inserted. The lossless IPG insertion circuit 524 is referred to herein as an "insertion circuit" due to the fact that the circuit 524 "inserts" the Sequence Ordered Set ||QN||. It should be appreciated however, that the circuit 524 could also be considered to perform a "removal" function due to the removal of the IDLE columns ||I||, but for ease of discussion the circuit 524 will be referred to as a lossless IPG removal circuit 524. The output of circuit 524 may then be provided to the PCS layer 528 within each port 508a-N. The PCS layer 528 may encode the data within each port 508a-N and then send data to the block interleave circuit 532 in batches of a predetermined size (e.g., 64 bits to 66 bits), depending upon the protocol used. Each PCS layer 528 of each port 508a-N provides its output to the block interleave circuit 532. In some embodiments, the block interleave circuit 532 interleaves the data received from each of the ports 508a-N in a round-robin fashion, starting with the first port 508a, then the second port 508b, until it reaches the last port 508N. After data has been interleaved from the last port 508N, the block interleave circuit 532 returns back to the first port 508a to receive the next batch of data therefrom. The block interleave circuit 532 enables data from multiple ports (e.g., 2, 4, 6, 8, . . . , etc.) to be transmitted via a single line/wire. Such an architecture helps to minimize the size of an IC chip used to enable such data transmission and/or reduce overall hardware costs associated with producing such an IC chip.

Data from each of the ports 508a-N is interleaved by the block interleave circuit 532 and then provided to a scrambler circuit 536, which perform a scrambling operation on all of the received data. The scrambler circuit 536 is used to scramble the data and make all of the data from each of the ports 508a-N appear as if it is originating from a single MAC.

Following the scrambling operation, the scrambled data is provided to an AM insertion circuit 540. The AM insertion process is performed to enable port delineation at the receiving side of the data transmission system. In some embodiments, the AM insertion circuit 540 manipulates the data stream received from the scrambler circuit 536 by inserting one or more AM intervals. AM insertion may occur once every predetermined number of blocks. For instance, AM insertion may occur once every 16400 blocks. In a situation where the ASIC 504 includes four ports 508a, 508b, 508c, 508d (e.g., where N=3), the AM insertion circuit 540 will insert four (4) AMs, with a spacing of 16400 blocks between each AM.

The process of inserting one or more AMs into the data stream may result in a removal of one or more IPG columns from an IPG interval. The output of the AM insertion circuit 540 is provided to a gearbox circuit 544, which is configured to appropriately convert the data for eventual transmission over the transmission line 556 in accordance with the data rates defined for the transmission line 556. For instance, the gearbox 544 may convert a data stream or collection of data streams having a particular clock frequency and parallel interface of a particular bit-width into a different number of data streams having a different clock frequency and a different bit-width. The transmission frequency used for the transmission line 556 (e.g., the MDI 232) may vary depending upon the protocol used.

The output of the gearbox 544 is provided to a transmission buffer 548, which appropriately buffers the received data until the data is ready for processing by the SERDES 552. The transmission buffer 548 may correspond to any type of known data buffer and may utilize any type of buffer memory. In some embodiments, the transmission buffer 548 corresponds to a FIFO buffer and operates on a first-in-first-out basis. Of course other types of buffers may be used and any type of buffer memory device can be used for the transmission buffer 548.

The SERDES 552 is configured to perform final data serialization processes on the data stream received from the transmission buffer 548. The SERDES 552 may include one or more circuits such as shift register circuits, equalization circuits, amplifier circuits, digital-to-analog converter circuits, analog-to-digital converter circuits, filter circuits, data latches. The output of the SERDES 552 is provided to the transmission line 556 for transmission across a communication network 104.

Figure 6:
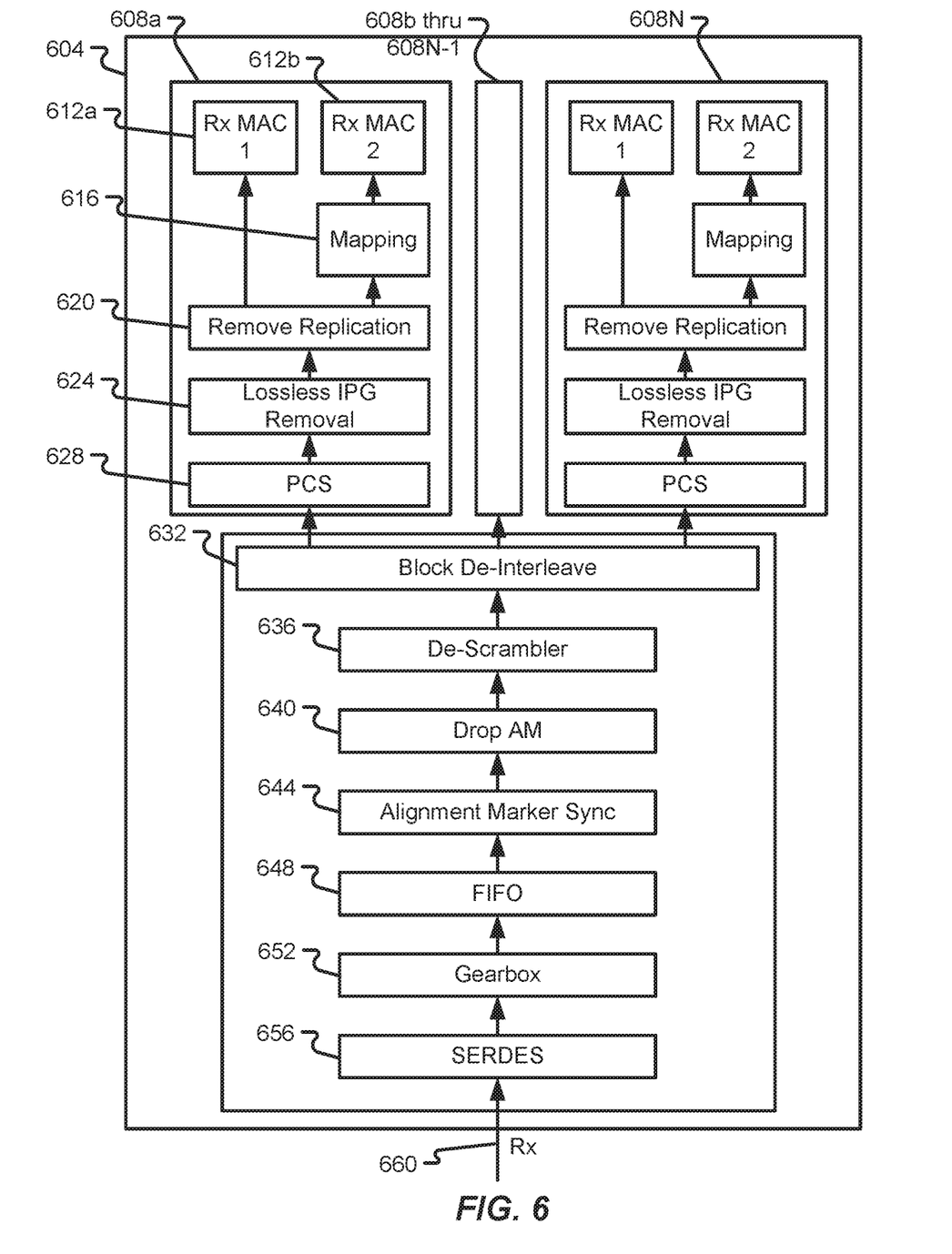
FIG. 6 is a block diagram depicting a receive-side of a data transmission system in accordance with at least some embodiments of the present disclosure.

With reference now to FIG. 6, additional details of a port ASIC 604 will be described in accordance with at least some embodiments of the present disclosure. The port ASIC 604 may correspond to a receive port ASIC 604 and may be similar or identical to a port ASIC 304, 316.

The receive port ASIC 604 may include a number of components that facilitate receiving and processing of data streams in accordance with at least some embodiments of the present disclosure. In particular, the receive port ASIC 604, much like the transmit port ASIC 504, may include a plurality of ports 608a-N along with a plurality of additional circuits configured to process information for the various ports 608a-N. Each of the ports 608a-N may be provided with a first receiver (Rx) MAC 612a and a second Rx MAC 612b. The first Rx MAC 612a may be directly connected with a de-replication circuit 620 whereas the second Rx MAC 612b may be connected with the de-replication circuit 620 via a mapping circuit 616.

Each port 608a-N is also shown to include a lossless IPG removal circuit 624. The lossless IPG removal circuit 624 may be considered a lossless IPG function or, alternatively, a component of a lossless IPG function. Specifically, the lossless IPG removal circuit 624 may correspond to a counterpart for the lossless IPG insertion circuit 524 provided at the transmit-side of the system. As such, the lossless IPG removal circuit 624 may be configured to process a received data stream and use information provided by the lossless IPG insertion circuit 524 to facilitate the processing of the data stream.

Even more specifically, the transmit-side of the data transmission system inserts one or more AMs and, consequently, IDLE columns are removed over multiple IPG intervals in order to make room for those AMs. So rather than blindly removing the IDLE columns, the lossless IPG insertion circuit 524 tags remaining IPG columns and further informs the receiving side of the total number of IDLEs have been removed. As discussed above, the lossless IPG insertion circuit 524 tags the remaining XGMII column(s) to tell the receive-side how many IDLEs to re-insert. This means that, in an error-free system, in which the Sequence Ordered Set ||QN|| is preserved, the top-off and the IPG repair window may not be needed. Simply said, information inserted into the data stream by the lossless IPG insertion circuit 524 is used by the lossless IPG removal circuit 624 to perform its functions. Contrary to the lossless IPG insertion circuit 524, the circuit 624 is referred to herein as the "removal circuit" due to the fact that the circuit 624 "removes" the Sequence Ordered Set ||QN||. It should be appreciated however, that the circuit 624 could also be considered to perform an "insertion" function due to the insertion or re-introduction of the IDLE columns ||I||, but for ease of discussion the circuit 624 will be referred to as a lossless IPG removal circuit 624.

In some non-limiting embodiments, the lossless IPG removal circuit 624 is configured to operate on the received and decoded XGMII traffic, in which <N> ||I|| columns are deleted in a particular IPG interval, as denoted by the existence of ||QN|| column. Upon detection of the XGMII ||T|| column, the remainder of the IPG interval is searched for the detection of an XGMII ||QN|| Sequence Ordered Set column. Once an XGMII ||QN|| Sequence Ordered Set column is detected, the delete count number <N> is extracted, and the XGMII ||QN|| column is replaced with an XGMII ||I|| column. The lossless IPG removal circuit 624 continues processing the data stream by inserting <N> ||I|| columns following replacement of the ||QN|| column with an XGMII ||I|| column. In some embodiments, the lossless IPG removal circuit 624 may utilize a mechanism for inserting the ||I|| columns that holds the read pointer of the clock-compensation FIFO and forces <N> ‖I‖ columns at the output. Once the <N> ‖I‖ columns have been inserted, the FIFO resumes output and advancement of the read pointer in a normal fashion.

Certain components of the ports 608a-N may be similar to similarly-named components of the ports 508a-N, except that the components of ports 608a-N are connected in reverse to perform a reverse processing of the ports 508a-N. For instance, the mapping circuit 616 maps the communication protocol back to the second protocol whereas the mapping circuit 516 was used to map the communication protocol from the second protocol to the first protocol (consistent with the protocol used by the other MAC). As a more specific but non-limiting example, the first Rx MAC 612a may utilize XGMII protocols to communicate with the de-replication circuit 620 whereas the second Rx MAC 612b may utilize 10M/100M/1G communication protocols or some other communication protocol different from the first Rx MAC 612a. As such, the mapping circuit 616 may map the protocol back to 10M/100M/1G from the XGMII protocol. The de-replication circuit 620 may undo the replication of data provided by the replication circuit 620. Similarly, the PCS layer 624 may decode the encoding that was performed by the PCS layer 528.

As mentioned above, ports on the transmit-side and receive-side may be configured with a component of the lossless IPG function. Specifically, a port on the transmit-side may include the lossless IPG insertion circuit whereas a port on the receive-side may include the lossless IPG removal circuit, which collectively or separately constitute the lossless IPG function.

In some embodiments, functionality of the lossless IPG function may be incorporated into the PCS and/or data replication/de-replication circuit. Prior to each port 608a-N receiving data, however, the data stream received at the receive line 660 should be processed to reverse the operations performed by the other components of the transmission port ASIC 504. In particular the receive port ASIC 604 is shown to include a SERDES 656, a gearbox 652, a receive buffer 648, a synchronization circuit 644, a drop AM circuit 640, a descrambler circuit 636, and the block de-interleave circuit 632. The data received at the receive line 660 is deserialized (e.g., parallelized) by the SERDES 656 and then provided to the gearbox 652, which adjusts the so-called "gear ratio" of the data from the receive line 660 to an appropriate speed and number of channels for processing by the other components of the ASIC 604. As a non-limiting example, the gearbox 652 may convert the data back from a 32 bit data stream to a 66 bit data stream (whereas the gearbox 544 converted the data from a 66 bit data stream to a 32 bit data stream).

The output of the gearbox 652 is provided to the receive buffer 648, which may be in the form of a FIFO buffer 648. In some embodiments, the receive buffer 648 is an asynchronous FIFO buffer that serves as the clock boundary between the network and the receive port ASIC 604, which is configured to operate using the PCS 628 clock domain rather than the network clock domain.

Data from the receive buffer 648 is provided to the synchronization circuit 644. The synchronization circuit 644 utilizes the various AM intervals inserted by the AM insertion circuit 540 to appropriately align/synchronize the data on a per-port basis.

In some embodiments, an AM may correspond to a 2 bit synchronization header having a predetermined format (e.g., a "01" or "10") that helps to ensure that the boundaries of encoded data are properly maintained and to facilitate port delineation. The AMs inserted at the transmit-side are not encoded at the transmit-side and, therefore, provide a quick and effective mechanism for identifying boundaries of data received from different transmit ports 508a-N (for eventual assignment to corresponding receive ports 608a-N). After the synchronization circuit 644 has processed the received data, the drop AM circuit 640 removes those AMs previously inserted by the AM insertion circuit 540, thereby leaving only the encoded data for further processing.

The data stream is then de-scrambled by the de-scrambler circuit 636. In some embodiments, the de-scrambler circuit 636 applies a reverse algorithm to the scrambling algorithm applied by the scrambler circuit 536. The de-scrambled data is then de-interleaved by the block de-interleaver circuit 632. The block de-interleaver circuit 632 distributes the data from a single stream onto the plurality of ports 608a-N. The data distribution among the ports 608a-N may occur in a round-robin fashion (following the interleaving process performed at the transmit-side) without departing from the scope of the present disclosure.

Each port 608a-N receives data from the block de-interleaver circuit 632 and utilizes the PCS layer 628 to decode the data prior to placing the decoded data onto the lossless IPG removal circuit 624 and then the de-replication circuit 620. At this point, the data will be provided to the different Rx MACs 612a, 612b depending upon which protocol is currently being used at each port 608a-N. Thus, each port 608a-N can support multiple protocols without departing from the scope of the present disclosure. The data provided to the appropriate Rx MAC 612a, 612b may be similar or identical to the data provided by the corresponding Tx MAC 512a, 512b of a corresponding port 508a-N.

Figure 7:
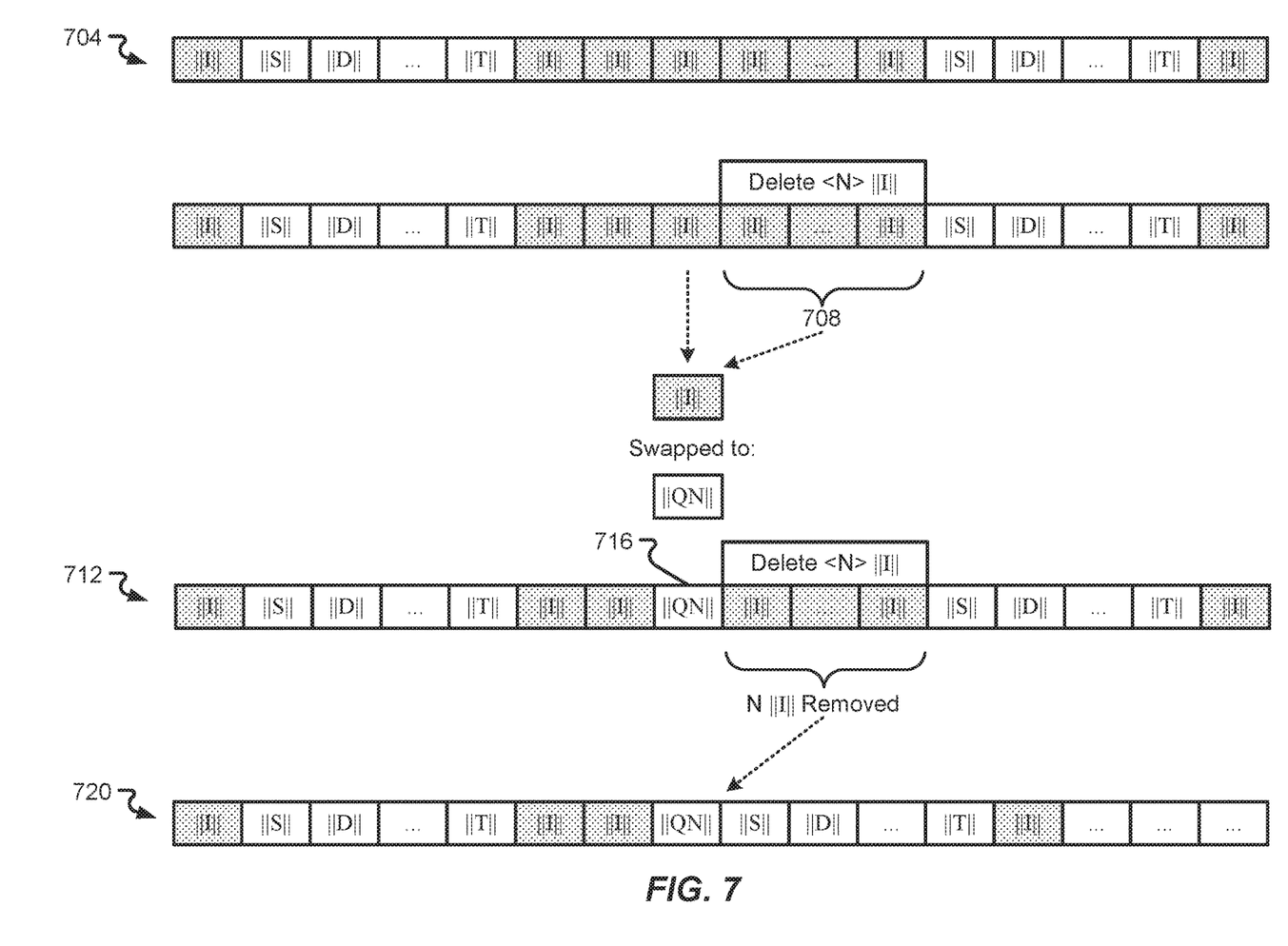
FIG. 7 is a block diagram depicting a series of data blocks belonging to a data stream that is processed on a transmit-side of a data transmission system in accordance with at least some embodiments of the present disclosure.
Figure 8:
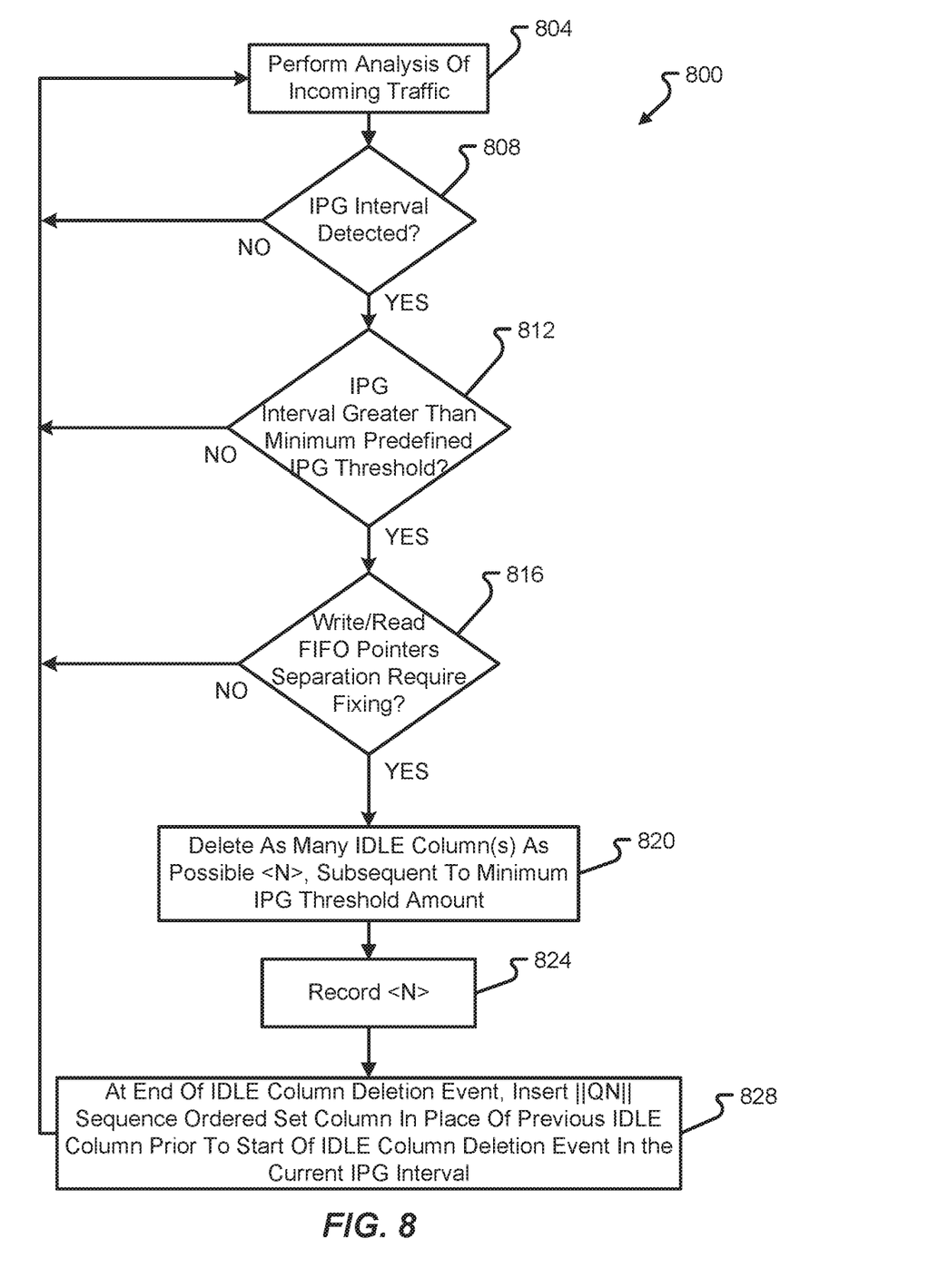
FIG. 8 is a flow diagram depicting a lossless IPG function operating on a transmit-side of a data transmission system in accordance with at least some embodiments of the present disclosure.

With reference now to FIGS. 7 and 8, additional details of the operation of the lossless IPG function on the transmit-side of the data transmission system will be described in accordance with at least some embodiments of the present disclosure. Specifically, illustrative operation of the lossless IPG insertion circuit 524 will be described along with a method 800 of performing the lossless IPG function at the transmit-side. The method 800 of performing the lossless IPG function on the transmit-side will be described with reference to an illustrative data stream 704 having a plurality of blocks.

The method 800 begins with the lossless IPG insertion circuit 524 performing an analysis of incoming blocks on the data stream 704 (step 804). The lossless IPG insertion circuit 524 is first searching for an IPG interval (step 808) and then searching to detect the point in current detected IPG interval that is greater than the minimum, predefined IPG threshold value (step 812). In other words, the lossless IPG insertion circuit 524 is analyzing the incoming traffic to determine if an IPG interval is detected that has a size greater than a predetermined size. Alternatively or additionally, the lossless IPG insertion circuit 524 may search for other types of columns within the data stream 704 in connection with searching for an IPG interval and eventual series of contiguous ‖I‖ columns. If either query 808 or 812 is answered negatively, the method 800 returns back to step 804.

However, if an IPG interval is detected that meets the requirements of query 812, the method 800 continues with the lossless IPG insertion circuit 524 determining, within the current IPG interval, whether all subsequent IPG columns are deemed candidates for deletion/removal (step 816). This can be determined by analyzing a position of a write/read pointer or a separation relationship relative to a predefined "ideal" value. If the write/read pointers separation do not require fixing (e.g., they are already at an ideal state), then the method 800 returns to step 804. In the event that the pointers are not at an ideal state and the query of step 816 is answered affirmatively, then as many IDLE column(s) are deleted as necessary or possible in order to either fix or move the pointers towards their ideal separation relationship (step 820). Illustratively, the write/read FIFO pointers may be fixed or advanced toward an ideal state. The total number of IDLE column(s) <N> is recorded upon the final deletion within the current IPG interval (step 824). The previous IPG column that preceded the start of the IDLE column deletion event is replaced with the XGMII ||QN|| Sequence Ordered Set column (step 828). In some embodiments, the recorded value <N> is inserted in the XGMII ||QN|| Sequence Ordered Set column.

As shown in FIG. 7, the data stream 704 may include a number of data blocks, which may also be referred to as data columns or XGMII columns. Depending upon the communication protocol employed, a data column may include a plurality of rows. Each different type of data column may have different rows of data. As a non-limiting example, XGMII traffic may include four octets per column. In other words, four octets may constitute an XGMII interface, which is an alternative way to refer to as an XGMII column. Continuing the non-limiting example, the types of columns that may be found in the data stream 704 include a starter column ||S||, a source address column ||Sa||, a data column ||D||, a terminate column ||T||, and an IDLE column ||I||. As can be appreciated, an IPG interval may correspond to that interval of columns or data blocks that reside between a terminate column ||T|| and a subsequent starter column ||S||. The size of an IPG interval may vary depending upon the volume of data packets being carried by the data stream 704 at any particular point in time. The IDLE columns ||I|| are provided as a mechanism to differentiate, at the receive side, between one packet of data and another packet of data (e.g., different data sets).

Based on the format of terminate columns ||T||, most communication protocols may require that at least two IDLE columns ||I|| follow a terminate column ||T||. In some embodiments, an IDLE column ||I|| represents an IPG size of 4 bytes (due to four idle characters provided therein). If a communication protocol has a minimum IPG interval size of 9 bytes, for example, then each terminate column ||T|| should be followed by at least two IDLE columns ||I|| (e.g., two IDLE columns, which inherently provide eight bytes of idle characters). It should be appreciated that an IPG interval may be larger than the minimum (e.g., if no traffic exists for some time between successive packets), but the minimum IPG interval size is used to define a minimum number of IDLE columns ||I|| (or minimum size of IPG as measured in bytes) is not less than a predetermined minimum value.

As can be seen in FIG. 7, the IDLE column immediately preceding the <N> contiguous IDLE columns 708 may correspond to the IDLE column ||I|| that is replaced with the Sequence Ordered Set column ||QN|| 716. The resulting data stream may correspond to a first modified data stream 712. The first modified data stream 712 may be further modified by eventually deleting/removing the <N> contiguous IDLE columns ||I|| to create a second modified data stream 720.

In accordance with at least some embodiments, the value of N for the <N> contiguous IDLE columns ||I|| may vary depending upon a number of factors. As a non-limiting example, the value of N may be at least two, thereby ensuring that at least two IDLE columns ||I|| are removed prior to swapping another IDLE column ||I|| for a Sequence Ordered Set ||QN|| 716. This will mean that at least three IDLE columns ||I|| will eventually be re-inserted at the receive-side of the data transmission system (e.g., one IDLE column ||I|| to replace the Sequence Ordered Set column ||QN|| and two IDLE columns ||I|| to replace the removed <N> ||I|| columns). Forcing a re-insertion of at least three IDLE columns ||I|| at the receive-side will ensure that the data stream output by the lossless IPG removal circuit 624 will comply with the XGMII communication protocol (or whatever communication protocol is being employed by the system). It should be appreciated, however, that the value of N may be larger than two. For instance, N may be an integer value that is greater than or equal to two. Suitable values of N may include, without limitation, three, four, five, . . . , ten, etc. In some embodiments, in a given IPG interval, the value of N is selected to ensure that the lossless IPG insertion circuit 524 naturally deletes the correct number of IDLE columns ||I||, in a given IPG interval, to satisfy the rate at which AMs are periodically inserted at the very end of the transmit PCS data path.

It should also be appreciated that the method 800 shall be performed on a per-port basis. Moreover, the method 800 may be repeated as long as a data stream 704 is flowing through the transmit port(s). Thus, although not depicted, the method 800 may return to step 804 following completion of step 816.

Figure 9:
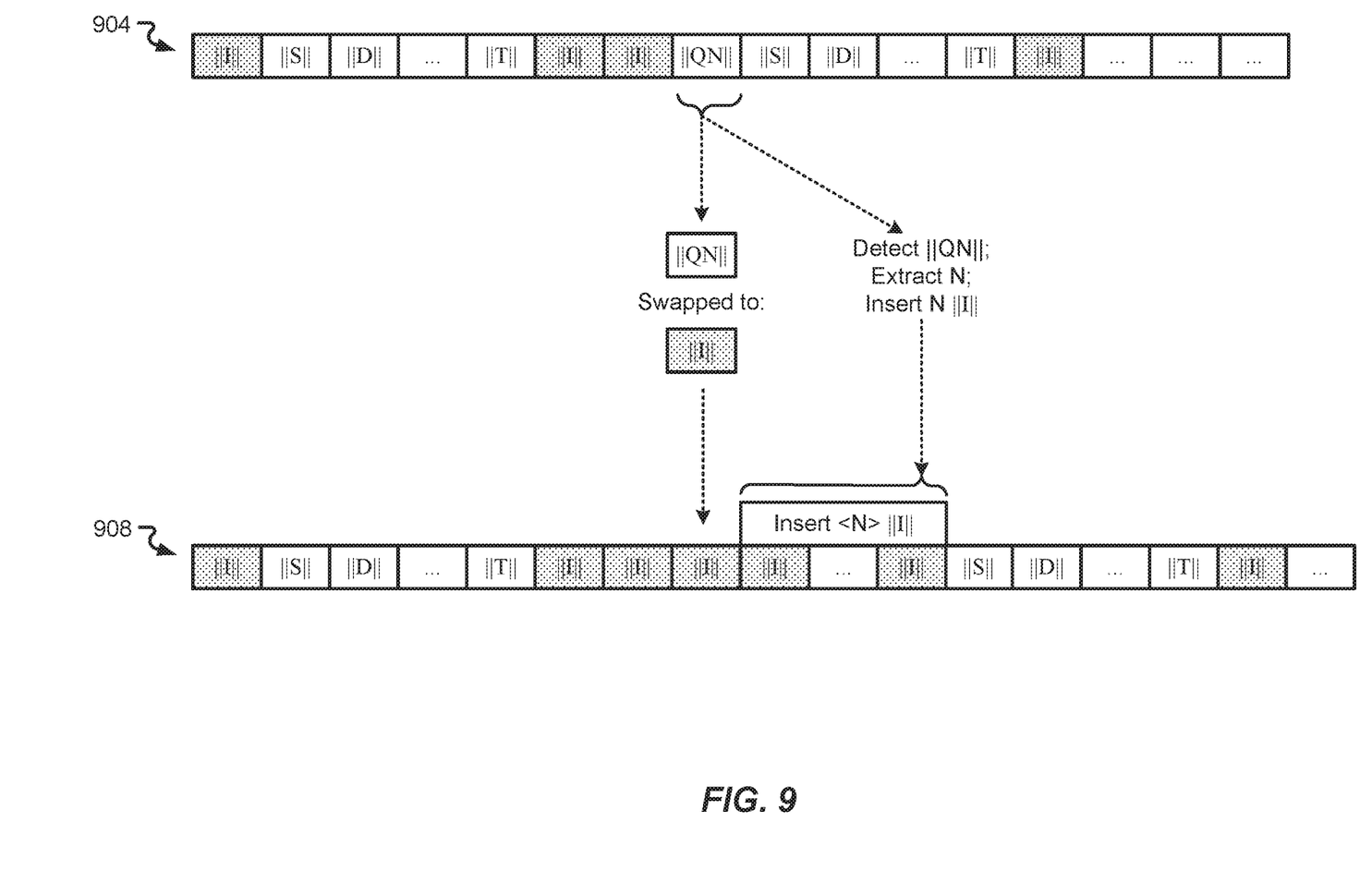
FIG. 9 is a block diagram depicting a series of data blocks belonging to a data stream that is processed on a receive-side of a data transmission system in accordance with at least some embodiments of the present disclosure.
Figure 10:
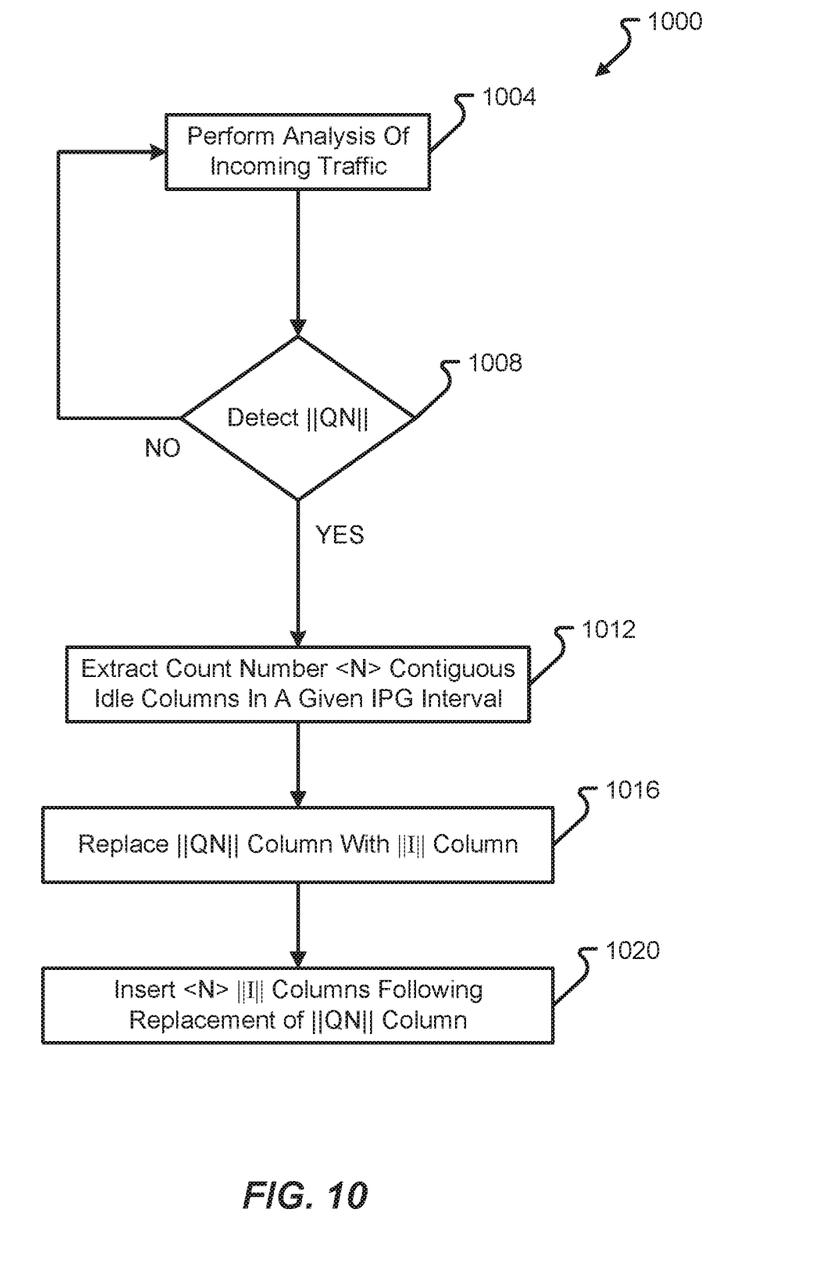
FIG. 10 is a flow diagram depicting a lossless IPG function operating on a receive-side of a data transmission system in accordance with at least some embodiments of the present disclosure.

With reference now to FIGS. 9 and 10, additional details of the operation of the lossless IPG function on the receive-side of the data transmission system will be described in accordance with at least some embodiments of the present disclosure. Specifically, illustrative operation of the lossless IPG removal circuit 624 will be described along with a method 1000 of performing the lossless IPG function at the receive-side. The method 1000 of performing the lossless IPG function on the receive-side will be described with reference to an illustrative data stream 904 having a plurality of blocks.

The method 1000 begins with the lossless IPG removal circuit 624 performing an analysis of incoming data stream 904 (step 1004). In some embodiments, the data stream 904 corresponds to a decoded XGMII data stream. The lossless IPG removal circuit 624 scans the data stream 904 for the existence of a Sequence Ordered Set column ||QN|| (step 1008). If such a column is not detected, the method returns to step 1004 and analysis continues. However, if the Sequence Ordered Set ||QN|| is detected, the lossless IPG removal circuit 624 continues by extracting the delete count number <N> (step 1012). Effectively, the lossless IPG removal circuit 624 obtains the information provided within the ||QN|| by the counterpart lossless IPG insertion circuit 524.

The lossless IPG removal circuit 624 then replaces the Sequence Ordered Set column ||QN|| with an IDLE column ||I|| (step 1016). Following replacement of the Sequence Ordered Set column ||QN||, the lossless IPG removal circuit 624 inserts <N> ||I|| columns immediately following the IDLE column ||I|| that replaced the Sequence Ordered Set column ||QN|| (step 1020). This particular step may result in the creation of a reconstructed data stream 908 that faithfully represents the data stream 704 that was processed at the transmit-side of the system. In some embodiments, this step may involve holding a read pointer of a clock-compensation FIFO and forcing the <N> |I|| columns at the output. After the <N> ||I|| columns have been inserted by the circuit 624, the FIFO is allowed to resume normal output and advancement of the read pointer.

Thereafter, the method 1000 either ends or returns back to step 1004 for ongoing processing of the data stream 904.

Moreover, the method 1000 may be repeated as long as a data stream 904 is flowing through the receive port(s).

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A communication device, comprising:
    at least one data port configured to facilitate data transmission or receipt via a communication network in compliance with a communication protocol; and
    a lossless interpacket gap (IPG) circuitry configured to:
        detect an IPG interval within a data stream; and
        in response to detecting a predetermined number of contiguous idle columns in the IPG interval, swap an idle column in the IPG interval with a filler column containing information that describes manipulations made to the IPG interval, the predetermined number being based at least in part on a number of Alignment Markers (AMs) that are periodically inserted into the data stream.

2. The communication device of claim 1, wherein the lossless IPG circuitry comprises a lossless IPG insertion circuit configured to perform the swapping of the idle column with the filler column by removing the idle column from the IPG interval and replacing the idle column with the filler column.

3. The communication device of claim 1, wherein the lossless IPG circuitry comprises a lossless IPG removal circuit configured to perform the swapping of the idle column with the filler column by removing the filler column from the IPG interval and replacing the filler column with the idle column.

4. The communication device of claim 1, wherein the idle column comprises an XGMII IDLE column.

5. The communication device of claim 1, wherein the lossless IPG circuitry is further configured to remove the predetermined number of contiguous idle columns from the IPG interval and include information in the filler column which describes the predetermined number of contiguous idle columns that are removed.

6. The communication device of claim 5, wherein the predetermined number of contiguous idle columns that are removed from the IPG interval immediately follow the filler column.

7. The communication device of claim 6, wherein the predetermined number of contiguous idle columns comprise two or more contiguous idle columns.

8. The communication device of claim 1, wherein the lossless IPG circuitry is configured to extract information from the filler column that identifies the predetermined number of idle columns that were removed from the IPG interval, and wherein the lossless IPG circuitry is configured to insert the predetermined number of idle columns back into the data stream.

9. The communication device of claim 8, wherein the lossless IPG circuitry is configured to insert the predetermined number of idle columns immediately following a location where the filler column is detected in the data stream.

10. The communication device of claim 1, wherein the at least one port comprises a first port and a second port and wherein the communication device further comprises:
    a block interleaver circuit configured to interleave data from the first port with data from the second port for transmission via a common transmit line.

11. A method of processing a data stream with lossless interpacket gap (IPG) circuitry, the method comprising:
    analyzing the data stream;
    detecting an interpacket gap (IPG) interval within the data stream; and
    in response to detecting a predetermined number of contiguous idle columns in the IPG interval, swapping an idle column with a filler column containing information that describes manipulations made to the IPG interval, wherein the predetermined number of contiguous idle columns depends upon a number of Alignment Markers (AMs) that are periodically inserted into the data stream.

12. The method of claim 11, wherein swapping the idle column in the IPG interval with the filler column comprises:
    removing the filler column from the IPG interval; and
    replacing the filler column with the idle column.

13. The method of claim 11, wherein swapping the filler column in the IPG interval with the idle column comprises:
    removing the idle column from the IPG interval; and
    replacing the idle column with the filler column.

14. The method of claim 11, wherein the filler column includes information describing the predetermined number of contiguous idle columns that have been or will be removed from the IPG interval.

15. The method of claim 14, further comprising:
    extracting the information describing the predetermined number of contiguous idle columns from the filler column; and
    inserting the predetermined number of contiguous idle columns back into the data stream.

16. A data transmission system, comprising:
    a first port comprising:
        a first MAC configured to operate in accordance with a first communication protocol;
        a second MAC configured to operate in accordance with a second communication protocol that is different from the first communication protocol;
        a mapping circuit configured to translate data received from the second MAC to the first communication protocol; and
        a lossless interpacket gap (IPG) IPG insertion circuit configured to detect a predetermined number of contiguous idle columns in an IPG interval of a data stream and, in response thereto, remove the predetermined number of contiguous idle columns from the IPG interval and further swap an additional idle column with a filler column; and
    a second port comprising:
        a third MAC configured to operate in accordance with the first communication protocol;
        a fourth MAC configured to operate in accordance with the second communication protocol;
        a second mapping circuit configured to translate data received for the fourth MAC from the first communication protocol to the second communication protocol; and a lossless IPG removal circuit configured to detect the filler column, swap the filler column with an idle column and further re-insert the predetermined number of contiguous idle columns back into the IPG interval.

17. The data transmission system of claim 16, wherein lossless IPG insertion circuit is configured to provide information in the filler column that describes the predetermined number of idle columns that were removed from the IPG interval and wherein the lossless IPG removal circuit is configured to utilize the information in the filler column to re-insert the predetermined number of contiguous idle columns back into the IPG interval prior to swapping the filler column with the idle column.

\* \* \* \* \*

UNITED STATES PATENT AND TRADEMARK OFFICE
CERTIFICATE OF CORRECTION

Page 1 of 1

PATENT NO. : 10,827,040 B2
APPLICATION NO. : 16/013007
DATED : November 3, 2020
INVENTOR(S) : Maurice D. Caldwell It is certified that error appears in the above-identified patent and that said Letters Patent is hereby corrected as shown below:

In the Claims

Column 16, Line 52 (Claim 16): "(IPG) IPG" should read --(IPG)--.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*